United States Patent [19]
Yu

[11] Patent Number: 5,895,334
[45] Date of Patent: Apr. 20, 1999

[54] HYDRAULIC CONTROL SYSTEM FOR AUTOMATIC TRANSMISSIONS

[75] Inventor: Pyunghwan Yu, Kyungki-do, Rep. of Korea

[73] Assignee: Hyundai Motor Company, Seoul, Rep. of Korea

[21] Appl. No.: 08/919,102

[22] Filed: Aug. 28, 1997

[30] Foreign Application Priority Data

Aug. 30, 1996 [KR] Rep. of Korea ............... 96-36791

[51] Int. Cl.$^6$ ........................... F16H 61/00
[52] U.S. Cl. ............... 475/128; 477/116; 477/117; 477/158; 475/120
[58] Field of Search ............... 477/116, 117, 477/115, 156, 158; 475/120, 127, 128

[56] References Cited

U.S. PATENT DOCUMENTS

| | | | |
|---|---|---|---|
| 4,982,622 | 1/1991 | Yamamoto et al. | 477/117 |
| 5,094,128 | 3/1992 | Kamada | 477/117 |
| 5,367,922 | 11/1994 | Jan | 475/123 X |
| 5,417,626 | 5/1995 | Gierer | 477/117 |
| 5,536,216 | 7/1996 | Jang . | |
| 5,558,599 | 9/1996 | Tsukamoto et al. | 477/116 |
| 5,643,123 | 7/1997 | Jang et al. | 475/128 X |
| 5,655,993 | 8/1997 | Fujimoto et al. | 477/116 |
| 5,697,865 | 12/1997 | Jang | 477/116 X |
| 5,720,694 | 2/1998 | Jang | 477/116 |
| 5,733,220 | 3/1998 | Iizuka | 477/116 |
| 5,749,805 | 5/1998 | Shimada et al. | 477/116 |
| 5,795,262 | 8/1998 | Robinson | 477/116 X |
| 5,797,821 | 8/1998 | Fujimoto et al. | 475/120 |

FOREIGN PATENT DOCUMENTS

| | | |
|---|---|---|
| 0149012 | 7/1985 | European Pat. Off. . |
| 8530800 | 2/1986 | Germany . |
| 2029522 | 3/1980 | United Kingdom . |

*Primary Examiner*—Dirk Wright
*Assistant Examiner*—Peter T. Kwon

[57] ABSTRACT

The present invention provides a hydraulic control system for automatic transmissions, which includes line pressure control mechanism for regulating hydraulic pressure generated in an oil pump to a line pressure level, damper clutch control mechanism for receiving the line pressure to control a damper clutch, shift control mechanism for receiving the line pressure and supplying the same according to each shift mode, hydraulic pressure distributing meachanism for receiving hydraulic pressure from the shift control mechanism and supplying the same to a plurality of friction elements, and hydraulic pressure control mechanism for regulating the line pressure and supplying the same to the hydraulic pressure distributing mechanism to correspond to each shift mode wherein abrupt pressure exhaust preventing mechanism is provided which slows exhaust of hydraulic pressure when shifting from drive D or reverse R ranges to a neutral N range.

10 Claims, 4 Drawing Sheets

5,895,334

HYDRAULIC CONTROL SYSTEM FOR AUTOMATIC TRANSMISSIONS

FIELD OF THE INVENTION

The present invention relates to a hydraulic control system for automatic transmissions, and more particularly, to a hydraulic control system for automatic transmissions which reduces shift shock and improves response speed when shifting from a drive D range to a neutral N range, and from a reverse R range to a neutral N range.

BACKGROUND OF THE INVENTION

Generally, automatic transmissions transfer engine power to a geartrain through a torque converter which acts as a fluid coupling. The geartrain is comprised of one or more planetary gearsets, one element of which is used as an input element, one as a reaction element, and one as an output element such that a suitable shift ratio can be outputted.

Each element of the planetary gearset is operated and disengaged by operation of a plurality of friction elements and one-way clutches to allow for the above selection of the elements of the planetary gearset as input, reaction, and output elements. The friction elements are selectively controlled at appropriate times by solenoid valves, ON/OFF and duty-controlled by a transmission control unit (TCU), to realize automatic shifting.

In the above hydraulic control system, when shifting into the neutral N range from either the reverse R or drive D range, shift shock occurs from the overly abrupt release of exhaust hydraulic pressure. Further, when shifting back into the drive D or reverse R ranges from the neutral N range, as hydraulic pressure controlling the friction elements is re-supplied through predetermined lines after being exhausted through exhaust ports to control the friction elements, reaction speed is slow.

SUMMARY OF THE INVENTION

The present invention has been made in an effort to solve the above problems. It is an object of the present invention to provide a hydraulic control system for automatic transmissions which reduces shift shock and improves response speed when shifting from a drive D range to a neutral N range, and from a reverse R range to a neutral N range.

To achieve the above object, the present invention provides a hydraulic control system for automatic transmissions, which comprises line pressure control means for regulating hydraulic pressure generated in an oil pump to a line pressure level, damper clutch control means for receiving the line pressure to control a damper clutch, shift control means for receiving the line pressure and supplying the same according to each shift mode, hydraulic pressure distributing means for receiving hydraulic pressure from the shift control means and supplying the same to a plurality of friction elements, and hydraulic pressure control means for regulating the line pressure and supplying the same to the hydraulic pressure distributing means to correspond to each shift mode wherein abrupt pressure exhaust preventing means is provided which slows exhaust of hydraulic pressure when shifting from drive D or reverse R ranges to a neutral N range.

BRIEF DESCRIPTION OF THE DRAWINGS

Further objects and other advantages of the present invention will become apparent from the following description in conjunction with the attached drawings, in which.

DETAILED DESCRIPTION OF THE PREFERRED EMBODIMENT

Preferred embodiments of the present invention will now be described in detail with reference to the accompanying drawings.

Figure 1:
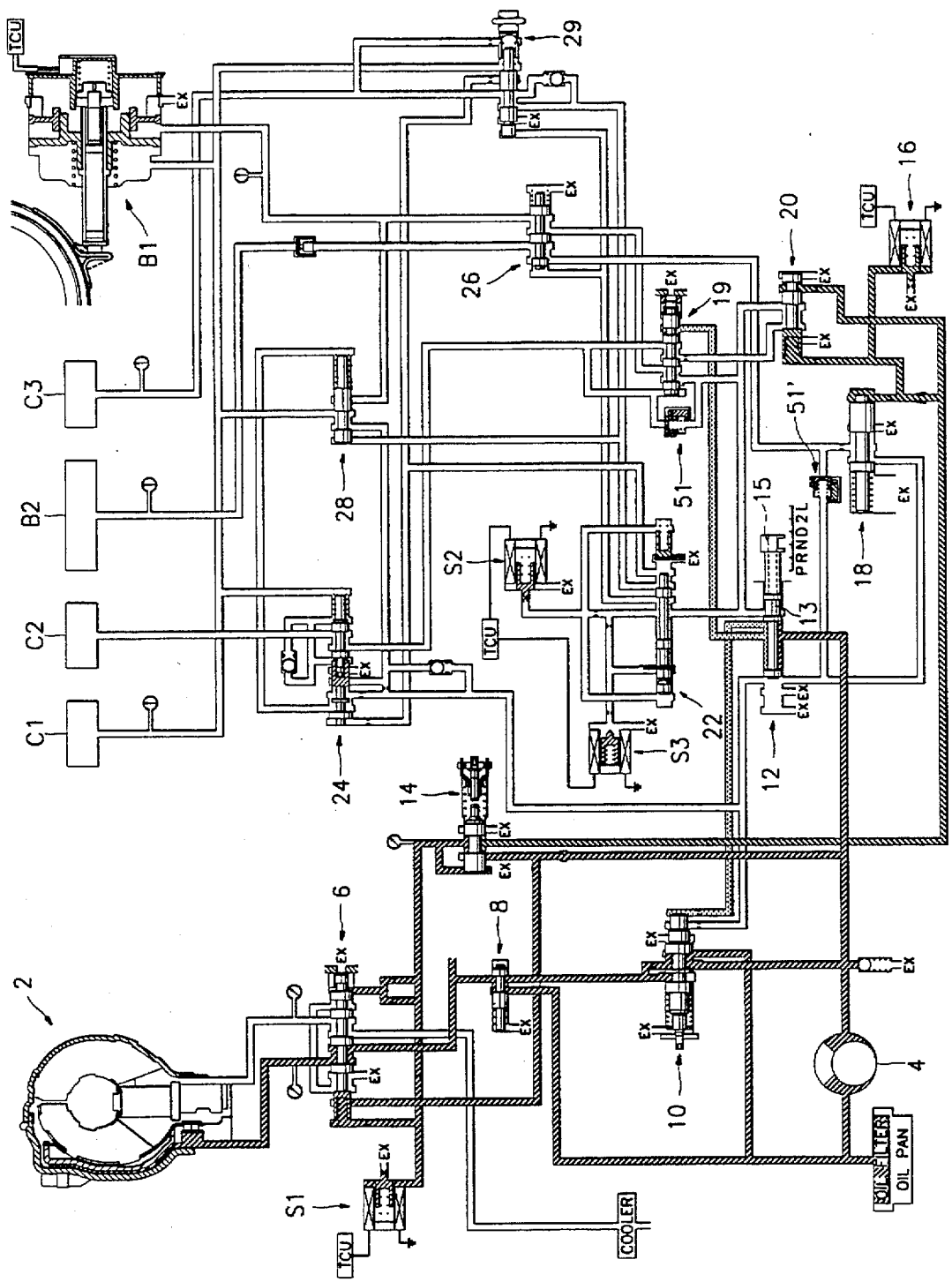
FIG. 1 is a hydraulic circuit diagram in a neutral N rang according to a preferred embodiment of the present invention.

Referring to FIG. 1, shown is a hydraulic circuit diagram in a neutral N range according to a preferred embodiment of the present invention. As shown in the drawing, a hydraulic control system of the present invention includes a torque converter 2 located between an engine crankshaft (not shown) and a transmission (not shown); an oil pump 4 including a drive gear, fixed on a pump drive hub (not shown) of the torque converter 2 to rotate with the same, and a driven gear connected to and drive by the drive gear; a damper clutch control valve 6 for varying hydraulic pressure generated by the oil pump 4 to operate or disengage a damper clutch (not shown) of the torque converter 2; a torque converter control valve 8, which regulates pressure from the torque converter 2; and a regulator valve 10 for maintaining or varying the hydraulic pressure generated by the oil pump 4 to a predetermined level of pressure, i.e., line pressure.

A position of a valve spool of the damper clutch valve 6 is changed by a damper clutch control solenoid valve S1, controlled by a transmission control unit (TCU).

The regulator valve 10 is connected both to a manual valve 12, indexed with a selector lever operated by a user, and a reducing valve 14, which decreases hydraulic pressure to a predetermined level lower than line pressure.

The manual valve 12 includes a valve spool 13 provided inside the manual valve 12 and an exhaust hole 15 for discharging drive pressure when shifting into the neutral N range.

Hydraulic pressure generated by the oil pump 4 is reduced by the reducing valve 14 and is then supplied to a N-R control valve 18 and a pressure control valve 20, operated by a pressure control solenoid valve 16.

The N-R control valve 18, a N-D control valve 19, and the pressure control valve 20 are duty controlled by the TCU such that a plurality of shift valves are slowly activated to reduce shift shock.

Further, a shift control valve 22, connected to the manual valve 12 via a line, is controlled by shift control solenoid valves S2 and S3.

Drive pressure, exhausted through the shift control valve 22, is supplied to a plurality of friction elements by ON/OFF controlled by the shift control solenoid valves S2 and S3.

The friction elements include a front clutch C1 operating in a reverse R range; a rear clutch C2 operating in first, second, and third speeds of a drive D range and disengaged in a fourth speed of the drive D range; an end clutch C3 disengaged in the first and second speeds of the drive D range, and engaged in the third and fourth speeds of the drive D range; a kickdown brake B1 disengaged in the first and third speeds of the drive D range, and engaged in the second and fourth speeds of the drive D range; and a low reverse brake B2 operating only in the reverse R range and in the reverse R range.

The above friction elements are connected to a plurality of shift valves through pressure lines for control of the friction elements. The shift valves include a rear clutch valve 24, a 1-2 shift valve 26, a 2-3/4-3 shift valve 28, an end clutch valve 29, and a N-D control valve 19.

A line connected to the rear clutch valve 24 is branched off to connect to the manual valve 12 and the regulator valve 10 such that hydraulic pressure is supplied from the same and fed to the rear clutch valve 24, then to the front clutch C1 to control the same.

The rear clutch valve 24 controls the rear clutch C2 through its connection with the shift control valve 22 and with the N-D control valve 19 via drive pressure lines.

The 1-2 shift valve 26 controls the low reverse brake B2 and the kickdown brake B1 through its connection with the shift control valve 22.

Third speed pressure from the shift control valve 12 acts on one side of the 2-3/4-3 shift valve 28, and hydraulic pressure exhausted from the rear clutch valve 24 is supplied to the 2-3/4-3 shift valve 28 such that the front clutch C1 and the kickdown brake B1 are controlled.

Further, the end clutch valve 29 receives fourth speed drive pressure, exhausted from the shift control valve 22, to selectively engage a front clutch and an end clutch.

Each of the above valves has a valve spool elastically supported by an elastic member.

Abrupt pressure exhaust preventing means is provided on a line connected to the manual valve 12 and branched off from a line connecting the N-R control valve 18 and the 1-2 shift valve 26, and on a line connecting the manual valve 12 and the rear clutch valve 24.

Figure 2:
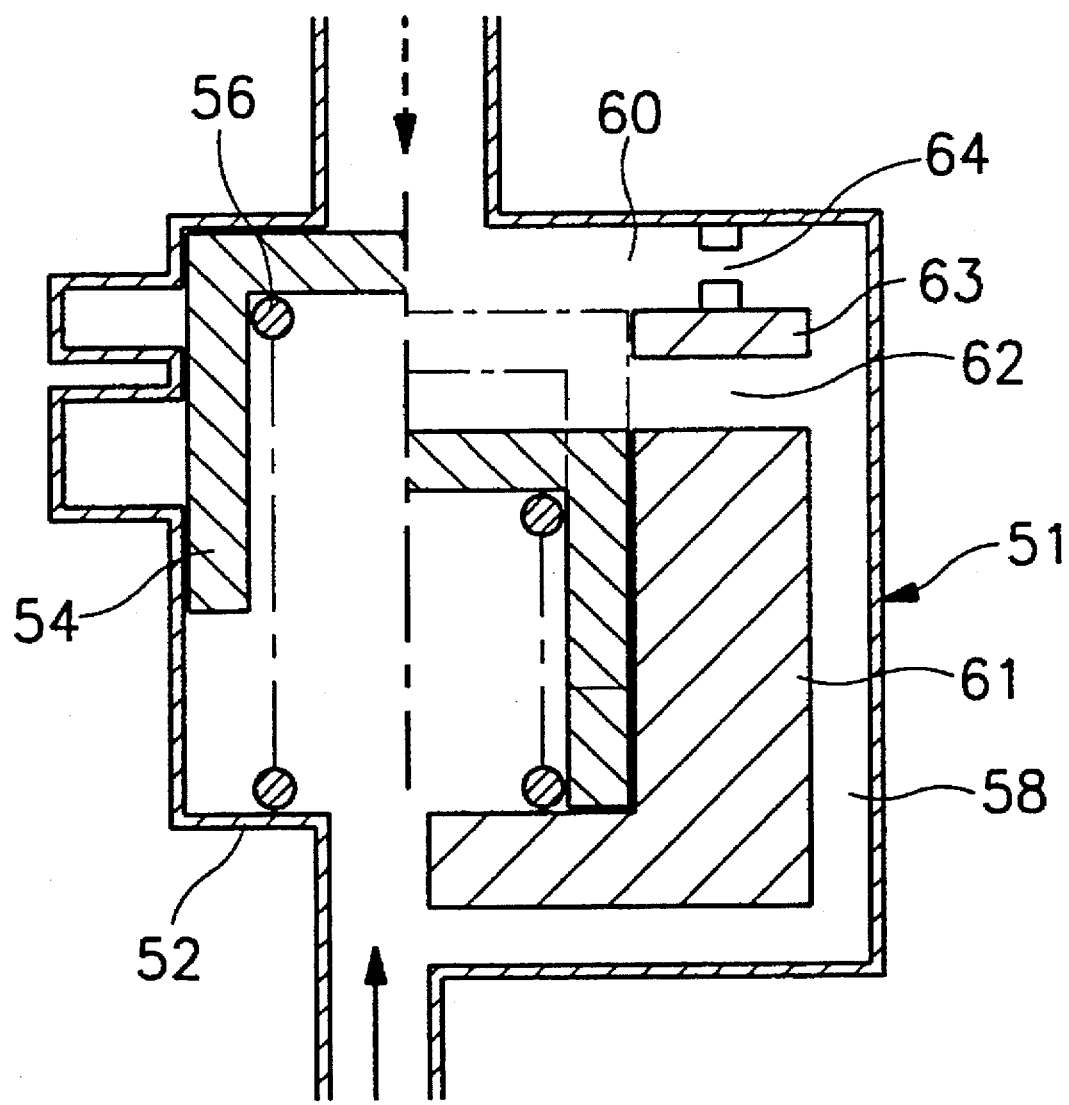
FIG. 2 is a sectional view illustrating an exhaust regulating valve shown in FIG. 1.
Figure 3:
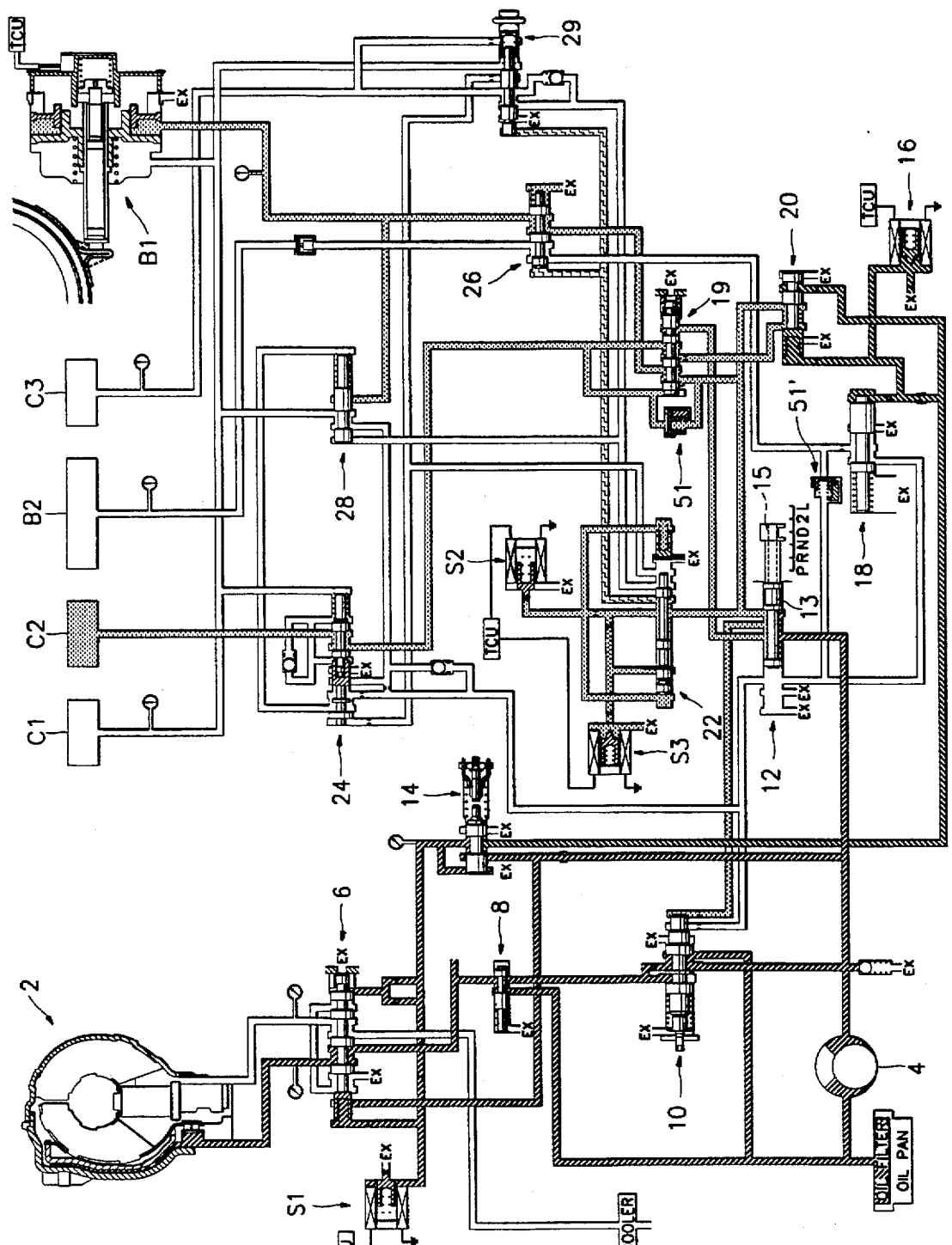
FIG. 3 is a hydraulic circuit diagram in a drive D range according to a preferred embodiment of the present invention.

Referring to FIG. 2, the abrupt pressure exhaust preventing means is realized through pressure exhaust regulating valves 51 and 51'. As shown in the drawing, the pressure exhaust regulating valves 51 includes a valve body 52 connected to hydraulic pressure lines and having a cavity formed therein, and a piston member 54 slidably provided in the cavity of the valve body 52.

An elastic member 56 is interposed between one side of the piston member 54, to elastically support the same, and a wall of the valve body 52 and a fixed member 61, provided in the cavity next to the piston member 54. It is preferable that the elastic member is a spring coil.

An exhaust passage 58 is formed in the valve body 52 between a wall of the same and the fixed member 61. The exhaust passage 58 includes an outer branch passage 60 provided next to a wall of the valve body 52, and an inner branch passage 62 provided inwardly from the outer branch passage 60 between a divider 63 and the fixed member 61, the divider 63 being formed between the branch passages 60 and 62. There is further provided an orifice 64 in the outer branch passage to prevent an abrupt exhaust of pressure.

The outer and inner branch passages 60 and 62 are opened and closed by the piston member 54, which is moved according to hydraulic pressure supply. That is, predetermined levels of hydraulic pressure flow selectively realizes the opening/closing operation of the branch passages 60 and 62.

Shifting from the neutral N range to the drive D and reverse R ranges and vice versa in the hydraulic control system structured as in the above will be described hereinafter.

Shifting from Neutral N Range to Drive D Range

First, when the selector lever is positioned to the neutral N range, the manual valve 12 also comes to be positioned at the neutral N range as it is indexed with the selector lever. Accordingly, as shown in FIG. 1, line pressure is supplied to the manual valve 12 from the oil pump 4.

The line pressure fed to the manual valve 12 is then supplied to one side of the regulator valve 10 to act against the elastic force of the elastic member elastically supporting the valve spool of the regulator valve 10. Next, a balance is realized between the line pressure acting on the valve spool of the regulator valve 10 and the hydraulic pressure supplied from the manual valve 12 such that hydraulic pressure is returned to an oil pan, and line pressure is controlled to a predetermined level.

Further, hydraulic pressure supplied to the N-D control valve 19 from the manual valve 12 remains standing by for shifting into the drive D range.

In the above neutral N range state, hydraulic pressure is not fed to a line connecting the manual valve 12 and the shift control valve 22, and valve spools block other lines used for hydraulic pressure supply in a first speed of the drive D range such that none of the friction elements are engaged.

Accordingly, the vehicle is maintained in a stopped state in the neutral N range.

When the selector lever is positioned by the user to the drive D range, a second speed creep state is realized immediately prior to the driving of the vehicle. The creep state is made possible by the supplying of hydraulic pressure to the shift control valve 22 from the manual valve 12.

In the drive D range, first speed pressure is supplied from the manual valve 12 through the pressure control valve 20, the N-D control valve 19, the rear clutch valve 24, to the rear clutch C2 to operate the same. At the same time, the hydraulic pressure supplied to the pressure control valve 20 is divided to be supplied to the N-D control valve 19 to stand by for a second speed of the drive D range.

A line connecting the manual valve 12 and the pressure control valve 20 is branched off to supply hydraulic pressure to the N-D control valve 19. The hydraulic pressure is then supplied to the 1-2 shift valve 26 where it stands by for shifting into the second speed of the drive D range.

The line supplying first speed pressure to the N-D control valve 19 is branched off and the exhaust regulating valve 51 is provided thereon.

At this time, first speed pressure does not pass through the exhaust regulation valve 51.

Further, when the shift control solenoid valves S2 and S3 are respectively controlled to ON and OFF second speed states, the valve spool of the shift control valve 22 opens a second speed line to move the valve spool of the end clutch valve 26. Accordingly, hydraulic pressure is supplied to the kickdown brake B1 through the N-D control valve 19. The TCU then controls both the shift control solenoid valve S2 and S3 to ON states.

As a result, the valve spool of the 1-2 shift valve 26 is moved to one side by the elastic member, and the hydraulic pressure supplied to the kickdown brake B1 is partly exhausted via an exhaust port of the 1-2 shift valve 26.

Accordingly, a stopped state is realized in the drive D range.

Shifting from Drive D Range to Neutral N Range

When the user positions the selector lever at the neutral N range from the drive D range, the manual valve 12 is also positioned at the neutral N range such that the valve spool of the same is moved to block the line for first speed hydraulic supply.

Accordingly, hydraulic pressure supplied to the kickdown brake B1 is exhausted through the exhaust port of the 1-2 shift valve 26 such that the kickdown brake B1 is disengaged. This is realized by the exhaust of hydraulic pressure from the shift control valve 22 which releases the hydraulic pressure acting on the 1-2 shift valve 26 such that the valve spool therein is moved to one side, allowing the exhaust of hydraulic pressure through the exhaust port.

Further, the hydraulic pressure supplied to the rear clutch C2 is exhausted through the exhaust hole 15 of the manual valve 12. Here, the hydraulic pressure passes through the exhaust regulating valve 51. If the pressure level of the hydraulic pressure being exhausted is high, the piston member 54 pushes against the elastic force of the elastic member 56 such that the outer and inner branch passages 60 and 62 open to allow the exhaust of hydraulic pressure through the exhaust passage 58.

In the above, if a predetermined amount of hydraulic pressure is exhausted (to lower the level of the pressure), the elastic member 56 pushes the piston member 54 such that the inner branch passage 62 is closed and hydraulic pressure is only exhausted through the outer branch passage 60.

Here, because of the orifice 64 formed in the outer branch passage 60, hydraulic pressure slowly exhausted. Accordingly, when shifting again into the drive D range, after shifting from the drive D range to the neutral N range, hydraulic pressure supplied to the rear clutch C2 is not fully exhausted such that the pressure remaining in the lines allows for easy shifting.

Shifting from Neutral N Range to Reverse R Range

Figure 4:
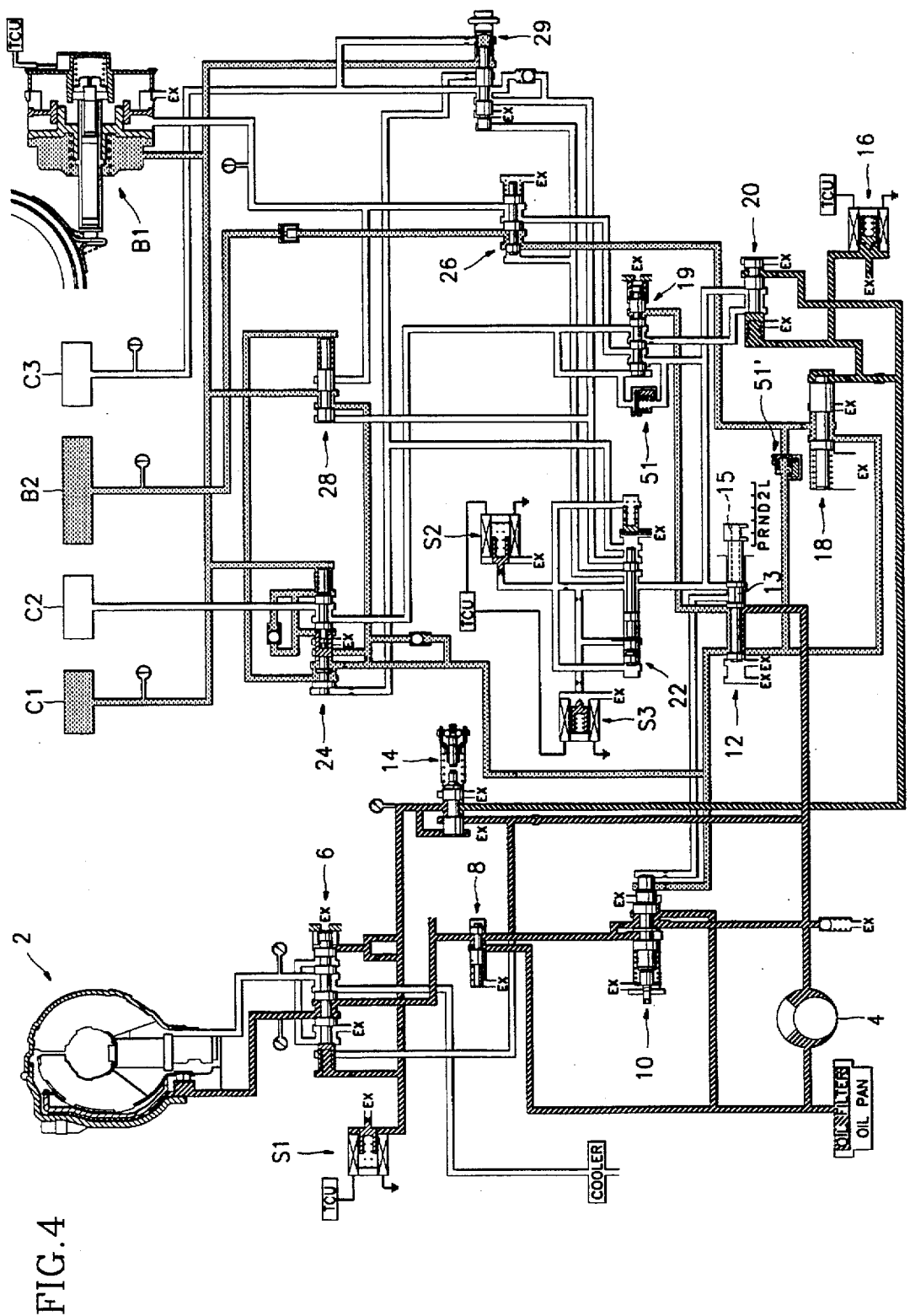
FIG. 4 is a hydraulic circuit diagram in a reverse R ran according to a preferred embodiment of the present invention.

When the selector lever is positioned, by the user, at the reverse R range from the neutral N range, the hydraulic pressure flow changes to that as shown in the hydraulic circuit diagram of FIG. 4.

As shown in the drawing, as the manual valve 12 is indexed with the index lever, the valve spool therein moves such that line pressure from the oil pump 4 is supplied to the rear clutch valve 24 and the N-R control valve 18.

Further, the line providing the pressure to the rear clutch valve 24 is branched such that the pressure is supplied, through the 2-3/4-3 shift valve 28, to act as operational pressure for the front clutch C1 and release pressure for the kickdown brake B1.

The hydraulic pressure supplied to the N-R control valve 18 is fed through the 1-2 shift valve 26 to the low reverse brake B2 to operate the same. Accordingly, as the front clutch C1 and the reverse brake B2 are activated, shifting into the reverse R range is achieved.

Shifting Reverse R to Neutral N

When positioning the selector lever back into the neutral N range from the reverse R range, the valve spool of the manual valve 12 is moved such that the exhaust port of the same is open to release the hydraulic pressure supplied to the front clutch C1 and the low reverse brake B2.

Namely, the hydraulic pressure acting on the front clutch C1 is exhausted through the exhaust port of the manual valve 12, while the hydraulic pressure acting on the low reverse brake B2 first passes through the exhaust regulating valve 51', provided on the line connecting the N-R control valve 18 and the 1-2 shift valve 26, before being supplied to exhaust port of the manual valve 12 such that the hydraulic pressure is exhausted slowly. Here, as the operation is identical to that when hydraulic pressure passes through the exhaust regulating valve 50 during shifting from the drive D range to the neutral N range, a description thereof will be omitted.

Accordingly, even when shifting back into the reverse R range after shifting is completed into the neutral N range from the reverse R range, as a predetermined amount of hydraulic pressure is left remaining in the lines, good shift response is provided.

In the hydraulic control system according to a preferred embodiment of the present invention, the abrupt exhaust of hydraulic pressure is prevented when shifting into the neutral N range from the drive D and reverse R ranges to reduce shift shock, and when shifting back into the drive D and reverse R ranges after shifting is realized from the drive D and reverse R ranges to the neutral N range, as a predetermined amount of hydraulic pressure is left remaining in the lines, good shift response is realized.

In this disclosure, there is shown and described only the preferred embodiment of the invention, but, as aforementioned, it is to be understood that the invention is capable of use in various other combinations and environments and is capable of changes or modification within the scope of the inventive concepts as expressed herein.

What is claimed is:

1. A hydraulic control system, comprising:

line pressure control means for regulating hydraulic pressure generated in an oil pump to a line pressure level;

damper clutch control means for receiving the line pressure to control a damper clutch;

shift control means for receiving the line pressure and supplying the same according to each shift mode;

hydraulic pressure distributing means for receiving hydraulic pressure from the shift control means and supplying the same to a plurality of friction elements; and hydraulic pressure control means for regulating the line pressure and supplying the same to the hydraulic pressure distributing means to correspond to each shift mode, wherein abrupt pressure exhaust preventing means is provided which slows exhaust of hydraulic pressure when shifting from drive D or reverse R ranges to a neutral N range.

2. The hydraulic control system of claim 1, wherein the abrupt pressure exhaust preventing means is comprised of a pressure exhaust regulating valve which blocks the supply of pressure to friction elements and allows flow of hydraulic pressure toward exhaust ports, and which includes an exhaust passage for varying exhaust speed of the hydraulic pressure according to a pressure level of the hydraulic pressure.

3. The hydraulic control system of claim 2, wherein the exhaust passage forms a plurality of branch passages which are selectively operated according to the pressure level of the hydraulic pressure being exhausted.

4. The hydraulic control system of claim 3, wherein one branch passage is provided with an orifice, the branch passage being opened for hydraulic pressure exhaust during an initial opening state of the pressure exhaust regulating valve.

5. The hydraulic control system of claim 2, wherein the pressure exhaust regulating valve comprises:

a valve body connected to hydraulic pressure lines and having a cavity formed therein;

a piston member slidably provided in the cavity of the valve body;

an elastic member interposed between one side of the piston member, to elastically support the same, and a wall of the valve body and a fixed member, provided in the cavity next to the piston member;

the exhaust passage, formed in the valve body between a wall of the same and the fixed member, the exhaust passage including a plurality of branch passages.

6. The hydraulic control system of claim 5, wherein the branch passages include an outer branch passage operated first when exhaust hydraulic pressure acts on the piston, and an inner branch passage through which hydraulic pressure is exhausted when the pressure level of the same surpasses a predetermined amount.

7. The hydraulic control system of claim 5, wherein the elastic member is a coil spring.

8. The hydraulic control system of claim 6, wherein the outer branch passage is provided with an orifice.

9. The hydraulic control system of claim 2, wherein the pressure exhaust regulating valve is provided on a line connected to the manual valve and branched off from a line connecting the N-R control valve and the 1-2 shift valve such that hydraulic pressure can flow in the direction of the manual valve but not in the opposite direction.

10. The hydraulic control system of claim 2, wherein the pressure exhaust regulating valve is provided on a line connecting the manual valve and the rear clutch valve such that hydraulic pressure can flow in the direction of the manual valve but not in the opposite direction.

* * * * *